United States Patent
Agarwal et al.

(10) Patent No.: US 9,231,850 B2
(45) Date of Patent: *Jan. 5, 2016

(54) KEEPALIVE MECHANISM TO MAINTAIN LINKS IN A LOSSY ENVIRONMENT

(75) Inventors: Navneet Agarwal, Bangalore (IN); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 990 days.

This patent is subject to a terminal disclaimer.

(21) Appl. No.: 13/400,819

(22) Filed: Feb. 21, 2012

(65) Prior Publication Data

US 2013/0219045 A1    Aug. 22, 2013

(51) Int. Cl.
*G06F 15/16* (2006.01)
*H04L 12/751* (2013.01)
*H04W 40/12* (2009.01)
*H04L 12/721* (2013.01)

(52) U.S. Cl.
CPC ............... *H04L 45/026* (2013.01); *H04L 45/70* (2013.01); *H04W 40/12* (2013.01)

(58) Field of Classification Search
CPC ..... H04L 45/026; H04L 45/70; H04L 67/145; H04L 43/10
USPC .......................................... 709/224, 239, 242
See application file for complete search history.

(56) References Cited

U.S. PATENT DOCUMENTS

| | | | |
|---|---|---|---|
| 6,118,791 A | 9/2000 | Fichou et al. | |
| 6,961,573 B1 | 11/2005 | Moon et al. | |
| 7,561,593 B1 | 7/2009 | Wilkie | |
| 7,724,676 B2 | 5/2010 | Gerstel et al. | |
| 7,940,661 B2 | 5/2011 | Ervin et al. | |
| 8,131,871 B2 | 3/2012 | Paggen | |
| 8,363,556 B2 | 1/2013 | Dunn et al. | |
| 8,862,774 B2 * | 10/2014 | Vasseur et al. | 709/239 |
| 2007/0258508 A1 * | 11/2007 | Werb et al. | 375/140 |
| 2009/0175193 A1 | 7/2009 | Shaffer et al. | |
| 2010/0054135 A1 * | 3/2010 | Rahman et al. | 370/242 |

OTHER PUBLICATIONS

Gnawali, et al., "The Minimum Rank Objective Function with Hysteresis", draft-ieft-roll-minrank-hysteresis-of-04, IETF Internet-Draft, May 2011, 11 pages.
Price, R. et al, "Still Alive: Extending Keep-Alive Intervals in P2P Overlay Networks", In Proc. CollaborateCom, Nov. 2009, pp. 1-10.
Thubert, et al., "RPL Objective Function Zero", draft-ietf-roll-of0-15, IETF Internet-Draft, Jul. 2011, 14 pages.

(Continued)

*Primary Examiner* — David Lazaro
(74) *Attorney, Agent, or Firm* — Parker Ibrahim & Berg LLC; James M. Behmke

(57) ABSTRACT

In one embodiment, a particular device determines a selected link from the particular device toward a root device in a computer network, wherein traffic destined away from the root device via the particular device utilizes the selected link in reverse. By monitoring a link quality of the selected link in reverse based on received traffic over the selected link, the particular device may determine whether the link quality is below a lower threshold. In response to the link quality being below the lower threshold, the particular device activates use of keepalive messages from the particular device over the selected link.

22 Claims, 12 Drawing Sheets

(56) References Cited

OTHER PUBLICATIONS

Vasseur, et al., "Routing Metrics Used for Path Calculation in Low Power and Lossy Networks", draft-ietf-roll-routing-metrics-19, IETF Internet-Draft, Mar. 2011, 31 pages.

Winter, et al., "RPL: IPv6 Routing Protocol for Low Power and Lossy Networks", draft-ietfroll-rpl-19, IETF Internet-Draft; Mar. 2011, 164 pages.

* cited by examiner

US 9,231,850 B2

KEEPALIVE MECHANISM TO MAINTAIN LINKS IN A LOSSY ENVIRONMENT

TECHNICAL FIELD

The present disclosure relates generally to computer networks, and, more particularly, to mainlining links in computer networks, e.g., via keepalive messages.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One significant challenge with routing in LLNs is ensuring that links to is neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

One fundamental problem is that nodes in many LLNs only maintain links in the UPWARD direction (toward a root node), and detect link failures reactively when sending a data packet. If a node has no data packets to send, it will not detect the link failure and will not notify the root that the link is no longer valid. As a result, the root will continue to send traffic down an invalid path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
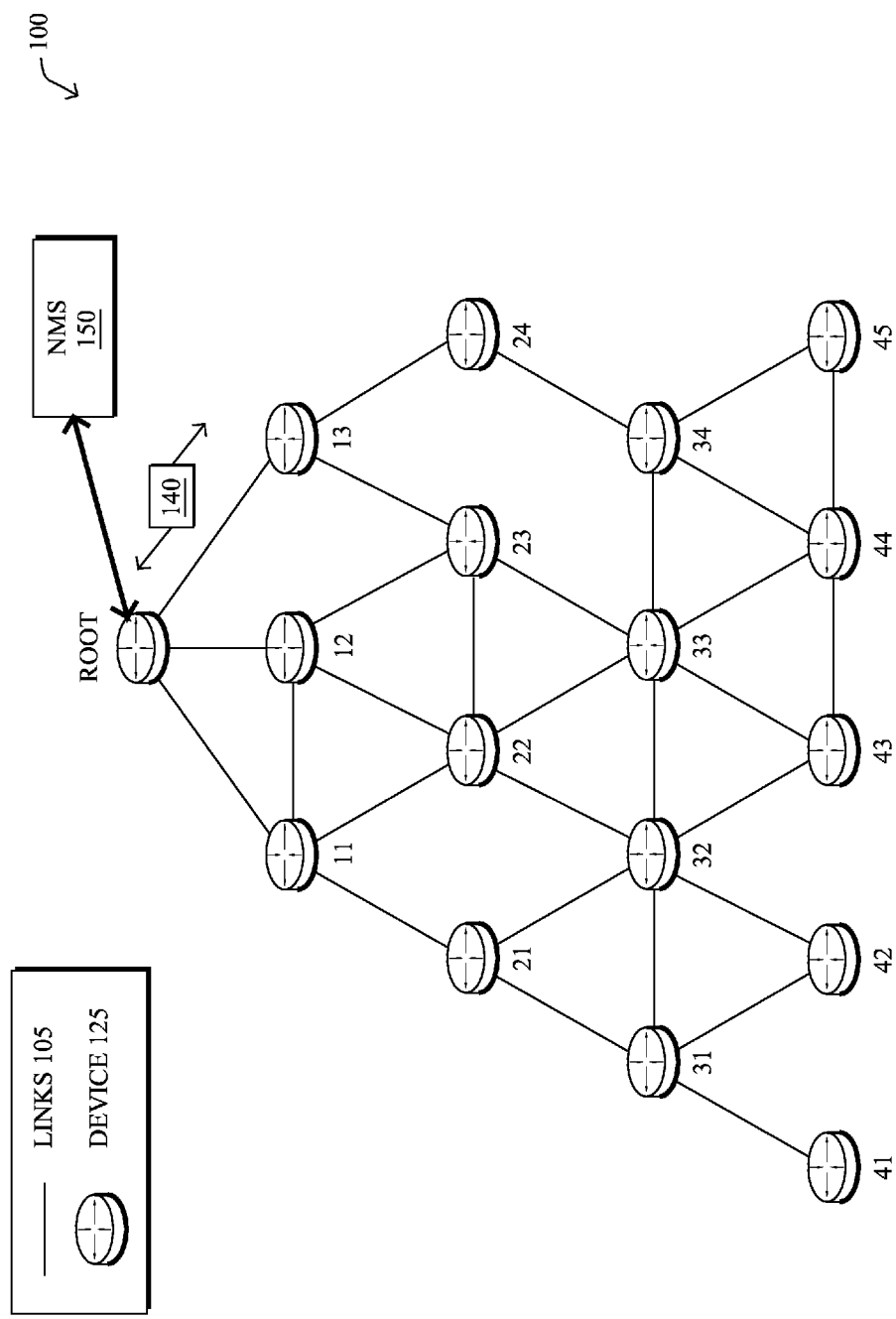
FIG. 1 illustrates an example communication network.

According to one or more embodiments of the disclosure, a particular device determines a selected link from the particular device toward a root device in a computer network, wherein traffic destined away from the root device via the particular device utilizes the selected link in reverse. By monitoring a link quality of the selected link in reverse based on received traffic over the selected link, the particular device may determine whether the link quality is below a lower threshold. In response to the link quality being below the lower threshold, the particular device activates use of keepalive messages from the particular device over the selected link.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "root," "11," "12," . . . "45," and described in FIG. 2 below) interconnected by various methods of communication. For instance, the links 105 may be wired links and/or shared media (e.g., wireless links, PLC links, etc.), where certain nodes 125, such as, e.g., routers, sensors, computers, etc., may be in communication with other nodes 125, e.g., based on distance, signal strength, current operational status, location, etc. In addition, various other devices, such as a head-end application device or a network management server (NMS) 150 may be present in the network 100, such as via a WAN reachable by node 11-45 through the root node. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
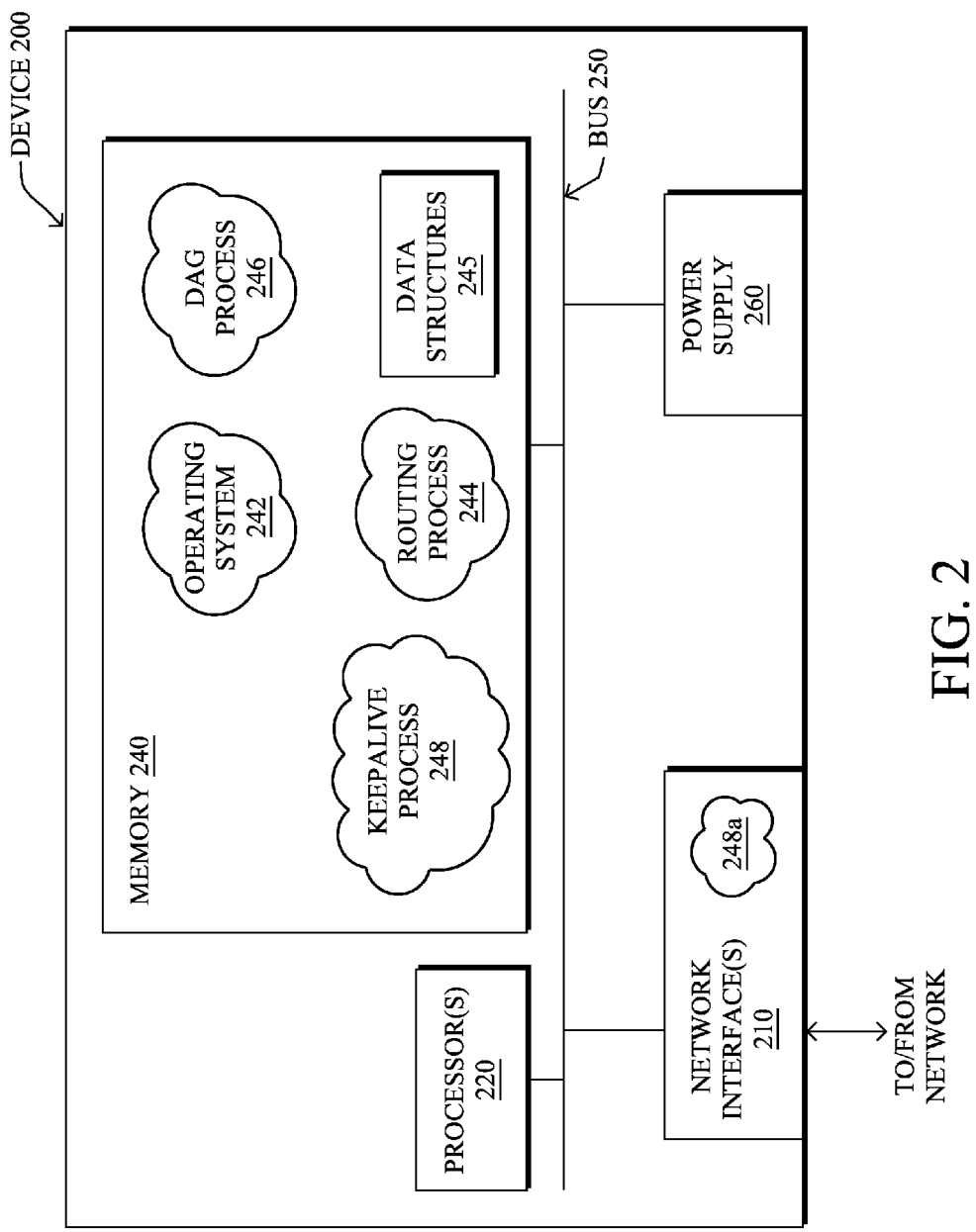
FIG. 2 illustrates an example network device/node.

FIG. 2 is a schematic block diagram of an example node/device 200 that may be used with one or more embodiments described herein, e.g., as any of the devices 125 shown in FIG. 1 above, and also NMS 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

It should be noted that PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the is signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative keepalive process 248, as described herein. Note that while keepalive process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

is Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version) and "The Minimum Rank Objective Function with Hysteresis"<draft-ietf-roll-minrank-hysteresis-of-04> by 0. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination is information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
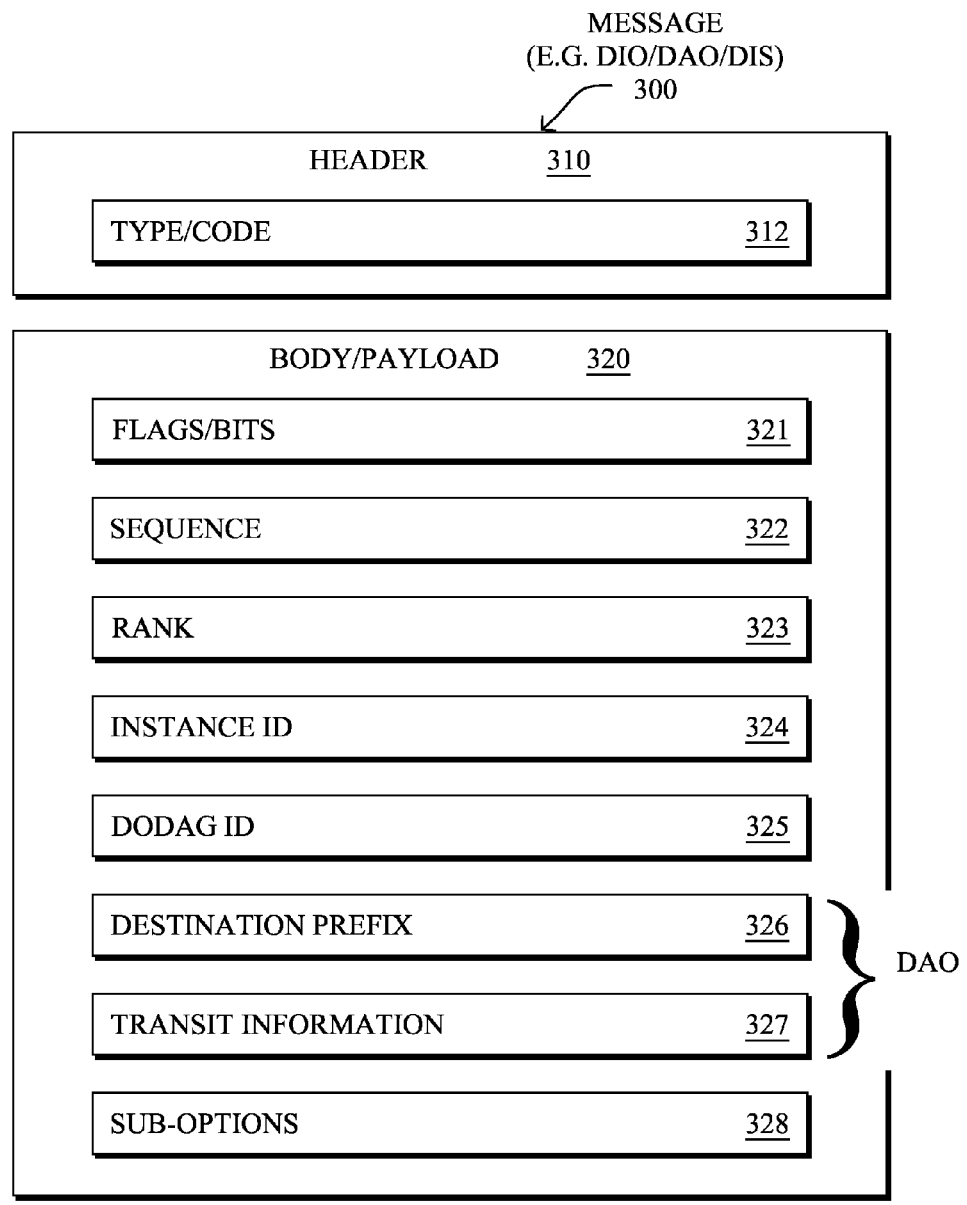
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the is body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
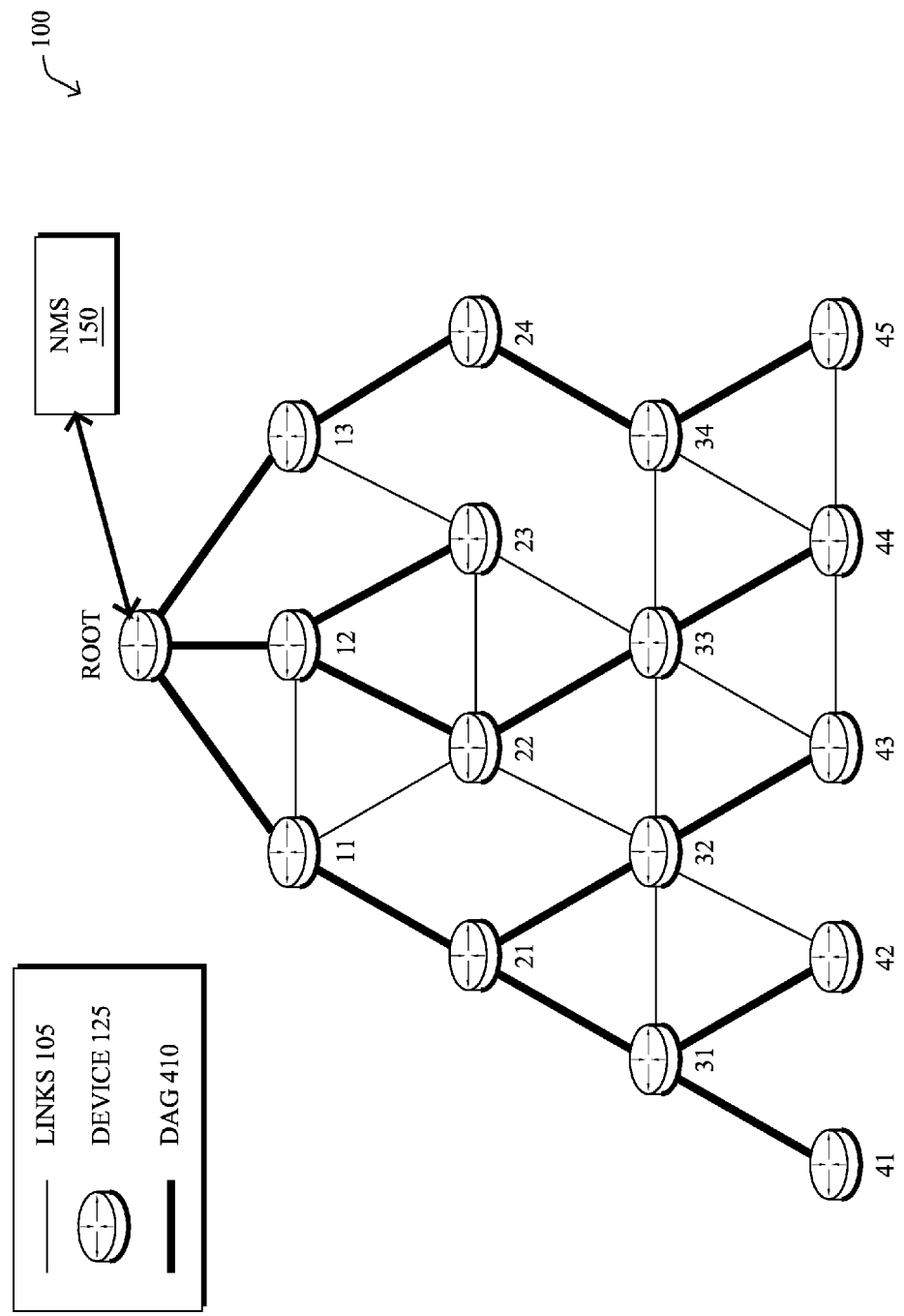
FIG. 4 illustrates an example directed acyclic graph (DAG) in the communication network as in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, one significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

Consider, for example, the illustrative cases of a packet 140 sent in the UPWARD is direction (i.e., from a network device in the DAG 410 toward/to the root) and in the reverse DOWNWARD direction, (i.e., away from the root toward a particular network device). First, in the UPWARD direction, assume that link 33-22 is down. When node 33 attempts to forward a packet in the UPWARD direction across link 33-22, the node 33 will detect that the link is down, and attempts to select an alternate next-hop (e.g., node 23) or else trigger a local routing repair to find another set of next-hops to send the packet. This reactive approach works well in the UPWARD direction. However, as described below, such a reactive approach does not work as well in the DOWNWARD direction.

In particular, for the DOWNWARD direction, consider a packet 140 sent from the root to node 33. When using source routing, the root will determine a source route from the root to node 33 (e.g., root-12-22-33), append the source route (e.g., using an IPv6 Routing Header), and forwards the packet to node 12. However, when the packet reaches the failing link (e.g., link 22-33), the packet will be dropped.

The fundamental problem is that nodes only maintain links in the UPWARD direction and detect link failures reactively when sending a data packet (generally to avoid proactive keepalive messages). If node 33 has no data packets to send, it will not detect the link failure and will not notify the root that link 22-33 is no longer valid. As a result, the root will continue to send traffic down an invalid path.

Unlike forwarding packets in the UPWARD direction, it is much more difficult to build and repair a routing topology when detecting link failures in the downward direction. In particular, many LLN protocols (e.g., RPL) build routing topologies in the UPWARD direction and reverse the links for use in the DOWNWARD direction. With such protocols, it is the responsibility of devices to maintain their links towards the root. In particular, if node 22 detects that link 22-33 is down, it cannot simply send a message to node 33 to find a new path.

Note that in certain systems, such as unconstrained IP networks, nodes can send regular proactive keepalive messages, then the routing topology will be kept up-to-date is on the timescales of the keepalive period. While a short keepalive period will detect link failures more quickly, doing so is costly in resource-constrained environments such as LLNs (e.g., limited energy and channel capacity). In addition, the root could also maintain multiple (diverse) paths and send multiple copies of the packet along each path to increase the likelihood of at least one being received by the destination. However, applying this technique to all traffic is also costly in resource-constrained environments.

Dynamic Keepalive Activation

The techniques herein allow a network device dynamically activate sending keepalive messages on a link (e.g., on an UPWARD path) based on observing the link quality of a corresponding reverse use of the link toward the network device (e.g., on a DOWNWARD path). Specifically, according to one or more embodiments of the disclosure as described in detail below, a particular device determines a selected link from the particular device toward a root device in a computer network, wherein traffic destined away from the root device via the particular device utilizes the selected link in reverse. By monitoring a link quality of the selected link in reverse based on received traffic over the selected link, the particular device may determine whether the link quality is below a lower threshold. In response to the link quality being below the lower threshold, the particular device activates use of keepalive messages from the particular device over the selected link.

Illustratively, the techniques described herein may be performed by hardware, software, and/or firmware, such as in accordance with the keepalive process 248/248a, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the RPL protocol or else various communication protocols, and as such, may be processed by similar components understood in the art that execute those protocols, accordingly.

In general, the techniques herein dynamically change the parameters for sending keepalive messages in response to the observed reliability of downward paths, for example thanks to user data or other distributed messages, thus optimizing the control load with regards to the frequency at which paths must be repaired. Keepalive parameters may comprise the condition (threshold) and period with which keepalive messages are sent. The following variables are defined:

1) Fq is the frequency/rate at which keepalive messages are transmitted, once the use of keepalives is activated;
2) Qmin and Qmax are minimum and maximum thresholds that are used to trigger the keepalive process at a particular node. Qmin and Qmax indicate the minimum link quality (for one or more given measurable metrics) below which the keepalive mechanism becomes active or the maximum value above which the keepalive mechanism stops, respectively.
3) Qpct represents a % (percent) value as an alternative variable to Qmin/Qmax. Based on Qpct, the keepalive mechanism may be triggered when the link quality is reduced by the specified % value, e.g., within a given period of time. Qpct is also useful when it is not possible or otherwise difficult to specify absolute link quality values.

In one or more particular embodiments, the above parameters (thresholds and keepalive rate) may be determined by the network devices on an individual device basis or else based on global (e.g., network) based configuration, and thus shared with all nodes in the computer network. For instance, these values may be preconfigured out-of-band or communicated via a configuration service (e.g., by the NMS 150 or a Dynamic Host Configuration Protocol (DHCP) server, etc.). Alternately, these values may be specified through other configuration mechanisms, such as part of the objective function of a routing topology (e.g., DAG 410), for example, through extension TLVs (sub-options 328).

Note that as used herein, "link quality" generally relies on a "low quality" to "high quality" scale, such that the underlying determining metrics, such as link cost or RSSI, may not directly equate to low versus high values. For instance, a low signal is strength may indicate a low link quality, but a low link cost may indicate a high link quality. Accordingly, the thresholds, such as a minimum or lower threshold versus an maximum or upper threshold, relates to the level of quality, and not necessarily to the underlying metric, as should be appreciated by those skilled in the art.

Operationally, a network device (e.g., node 33) first determines a selected link from itself toward a root device in a computer network, such as selecting a parent node (e.g., node 22) for DAG 410 toward the root device (path 33-22-12-root). According to many LLN routing protocols, such as RPL, the source device utilizes the path, and thus selected link, in reverse to reach the network device (reverse path root-12-22-33) or to pass through the network device to reach other device (e.g., node 44).

Figure 5:
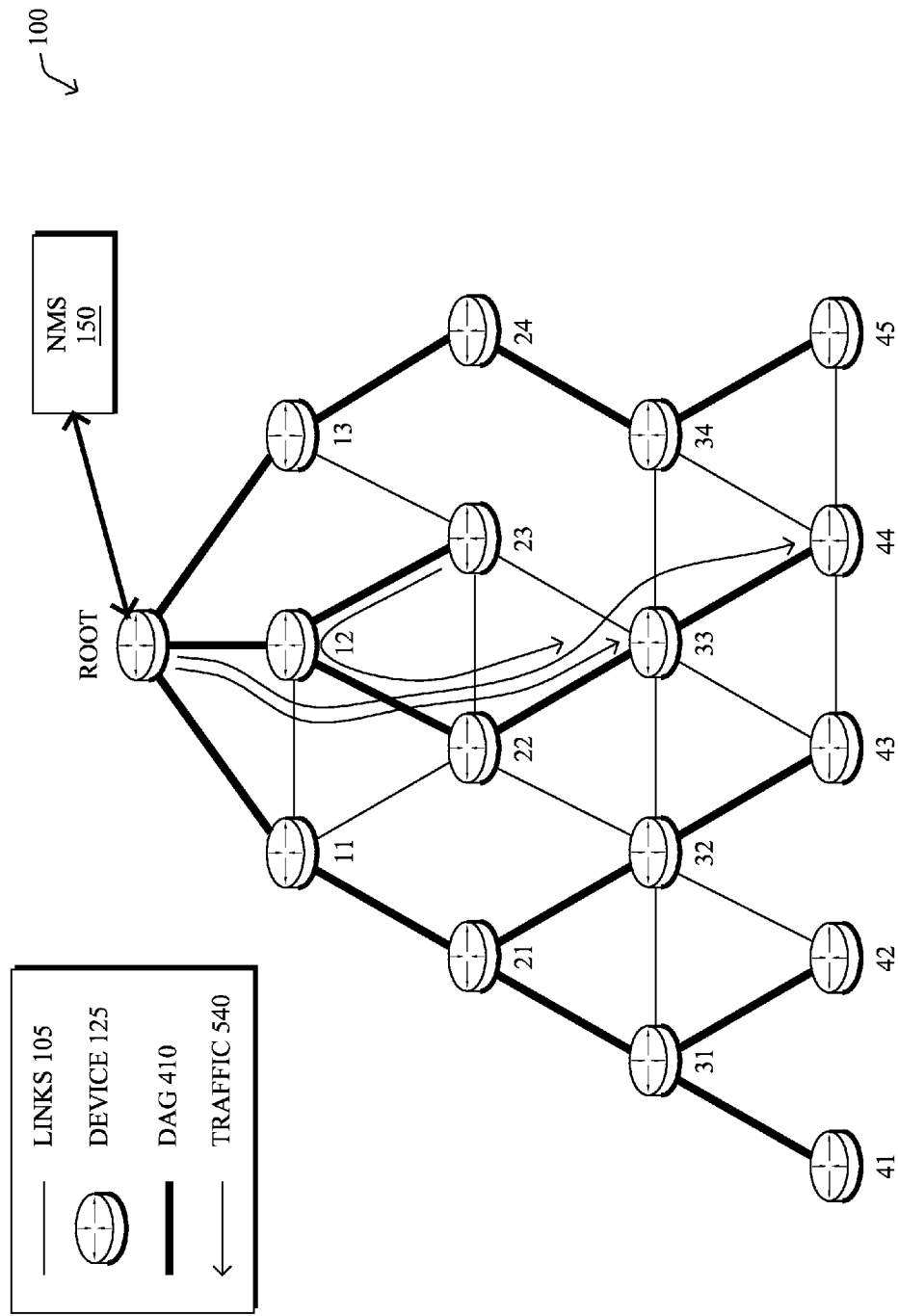
FIG. 5 illustrates an example of link quality monitoring.

Each node (configured to perform the operations herein) may first determine whether the Qmin/Qmax/Qpct values have been configured. If so, the node monitors the link quality of the selected link in reverse based on received traffic over the selected link, and compare it against Qmin or Qpct. For instance, as shown in FIG. 5, assume that node 33 receives user traffic, network configuration traffic, or other traffic, generally denoted as "traffic 540," over the selected link from node 22. Based on the quality of that received traffic, e.g., signal strength (received signal strength indicator, RSSI), link cost, fully versus partially received transmissions (e.g., observing the number of NACK messages sent to the sending device), missed broadcast transmissions (e.g., received from nodes other than the selected parent node), etc., the particular device (node 33) may thus determining whether the link quality is below a lower threshold (Qmin), or else is reduced beyond a configured percent threshold (Qpct) within a configured length of time.

As an example, assume that Qmin relates to a signal strength of "40," and Qpct may be 20% (e.g., since the last measurement or within an hour). If the current signal strength is "60," and then a signal strength of "45" is measured next (or within the hour), then Qpct has been surpassed. If the signal strength more slowly decreased over time, then once it reached "40" (or surpassed "40," depending upon configuration), then Qmin would thus be breached as well.

Notably, the link quality measurement collected by a network device may be based on an immediate occurrence (e.g., detecting a current signal strength for a given transmission), or may be based on historical data about the quality of downward traffic to the network device, such as a rolling average of quality values, surpassing a threshold for a given period of time, or surpassing it a certain number of times within a given period of time, etc.

Figure 6:
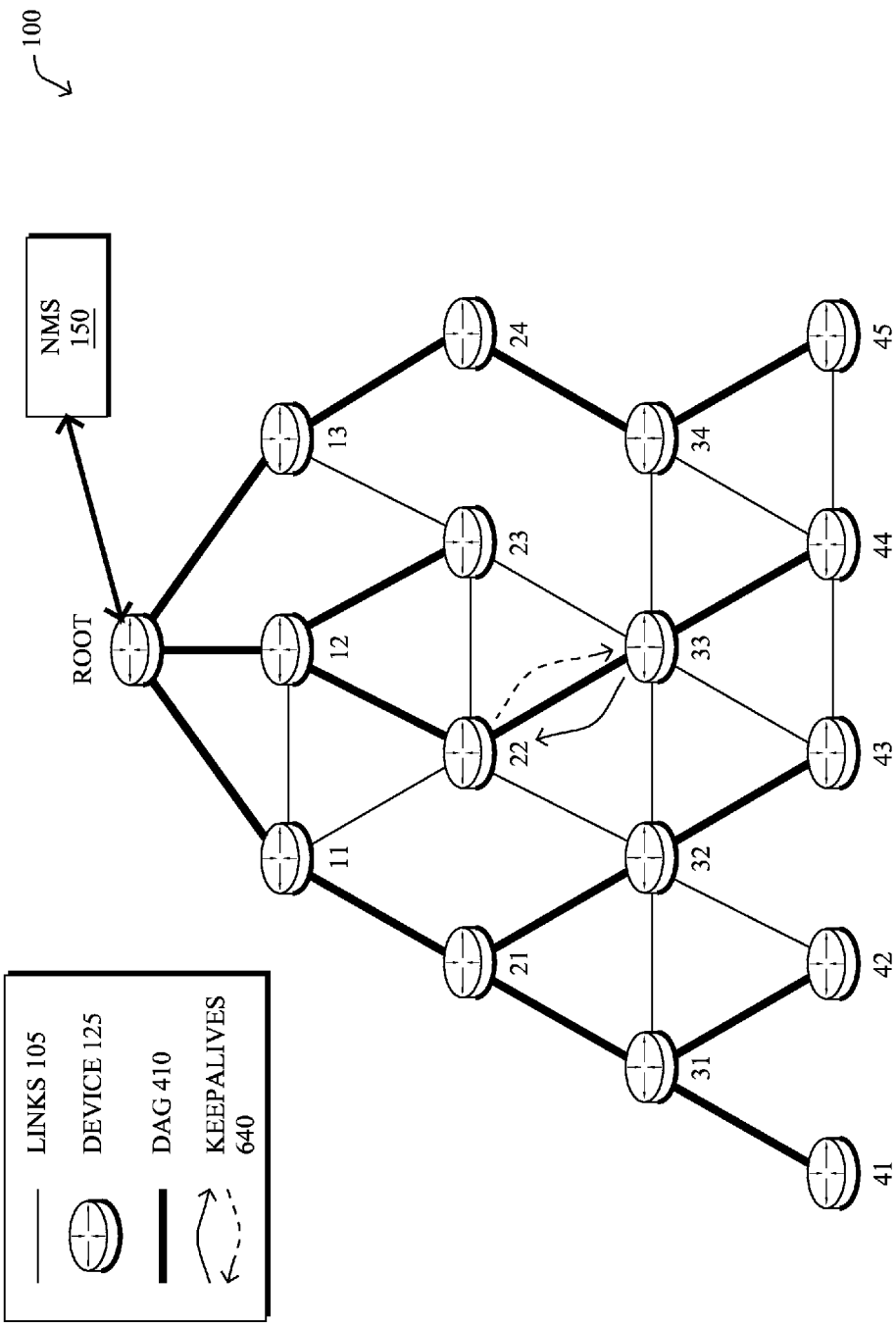
FIG. 6 illustrates an example of keepalive messages.

If the monitored link quality falls below Qmin or is outside the range of Qpct, the node will enter into keepalive monitoring phase (KMP). In other words, in response to the link quality being below the lower threshold, or being reduced beyond the configured percent threshold within the configured length of time, the particular device activates the use of keepalive messages from itself over the selected link. As shown in FIG. 6, during the Keepalive Monitoring Phase, the device (node 33) sends probing/keepalive messages 640 over the selected link to the preferred parent/next-hop as per the configured Fq values. Note that the techniques herein do not mandate the use of a particular Keepalive mechanism such as "ping," NS, BFD, etc., as will be understood by those skilled in the art.

The particular device continues in the Keepalive Monitoring Phase to transmit keepalive messages 640 until the link quality goes above Qmax (or is again within the Qpct), thus deactivating the use of keepalive messages in response to determining that the link quality is above an upper threshold. In addition, each node/device maintains two additional variables: a KMP interval (KMPi) and a KMP count (KMPc). These variables provide information to the device regarding when to initiate a local link repair mechanism (if the routing protocol supports one) to select an alternate preferred parent/next-hop, i.e., a new selected (and monitored) link.

Using the KMPi variable, which helps avoid overreacting to temporary link degradation, the device may place an outer bound on how long it will remain in the monitoring phase before triggering link repair. In other words, the device may deactivate the use of keepalive messages in response to one of either expiration of a configured length of time after activating the use of keepalives (KMPi). (Note that KMPi may alternatively indicate a maximum number of keepalive messages to be transmitted, which is given Fq, would generally infer a given length of time, regardless.) For example, it is possible that the selected link may remain in a degraded state for a prolonged period that may exceed KMPi. In this case, having determined that the link quality is still not above an upper threshold (Qmax) within the KMPi period, the device aborts sending keepalives (deactivating the use of keepalive messages), and initiates a local link repair to select an alternate parent (new link) if one is available, such that traffic destined away from the root device via the particular device utilizes the new link in reverse (and the routing topology is then updated). If no alternate parent is available the node may choose to initiate a full node discovery process.

Figure 7A:
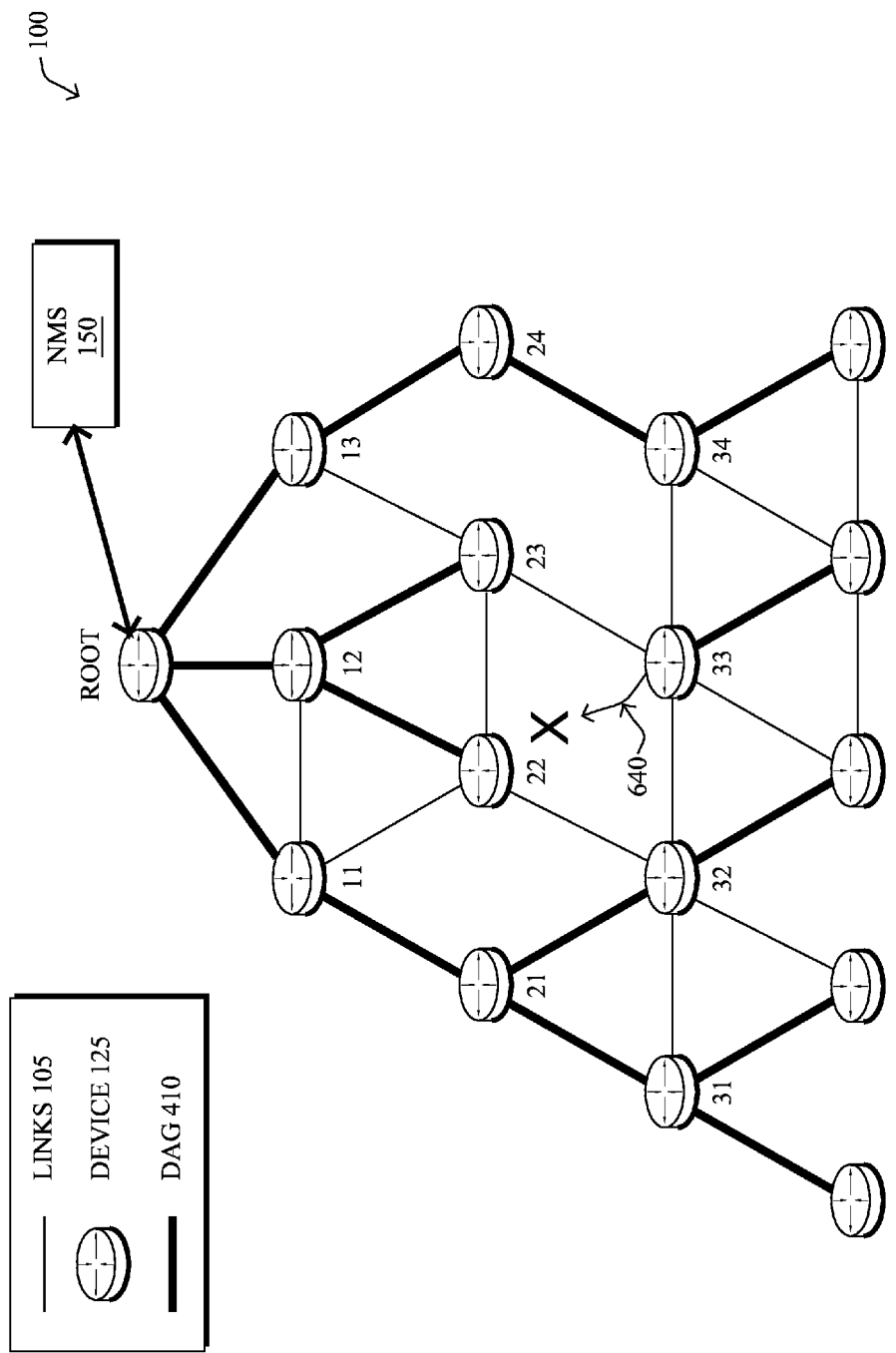
FIGS. 7A-7B illustrate an example of reverse path validation.
Figure 7B:
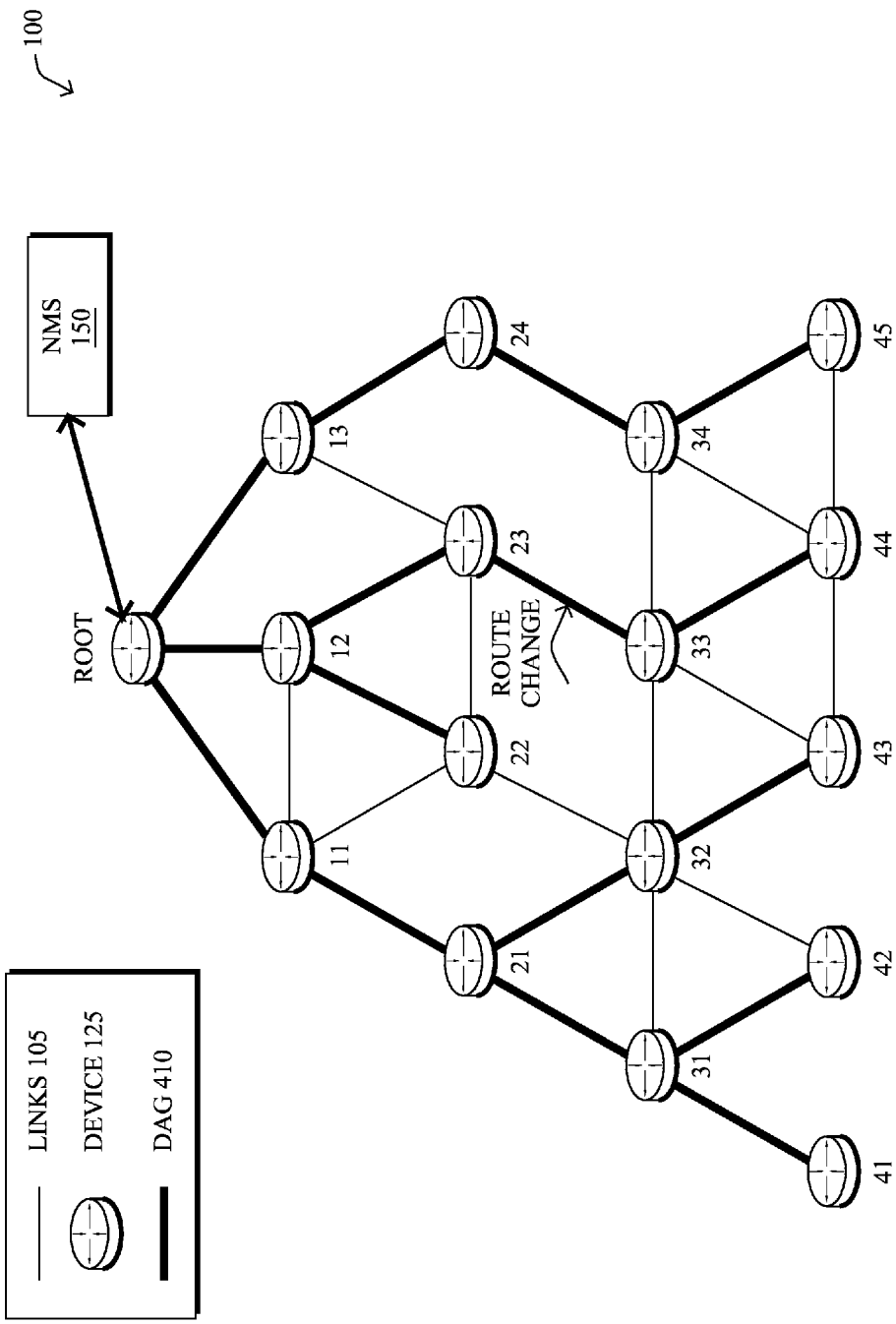

As a simplified example, FIG. 7A illustrates the degradation of the selected link (33-22) beyond the KMPi period. At such a time, the device (node 33) may initiate local link repair, and as shown in FIG. 7B, may select a new link (new parent node 23), such that the corresponding DAG 410 provides traffic over the newly selected link in reverse, accordingly.

In addition, the KMPc variable may be used to monitor the frequency (e.g., on an hourly basis) that the node enters the monitoring phase, that is, monitoring a number of times the selected link activates and deactivates the use of keepalive messages. If this frequency exceeds a fixed threshold (e.g., being greater than five times within some configured length of time), then this is an indication that the link quality throttles too frequently, and it may be preferable for a node to look for an alternate preferred parent/next-hop by initiating a link repair mechanism. Note, too, that this variable may be extended to provide time-of-day historical data on when the link quality is stable or degraded. In yet another embodiment, such a link may be flagged as unstable, for example, as a routing metric to be distributed/advertised into the network to avoid having other nodes/devices selecting that degraded/unstable link, thus possibly excluding the link from being included in the routing topology (e.g., for a period of time).

Figure 8:
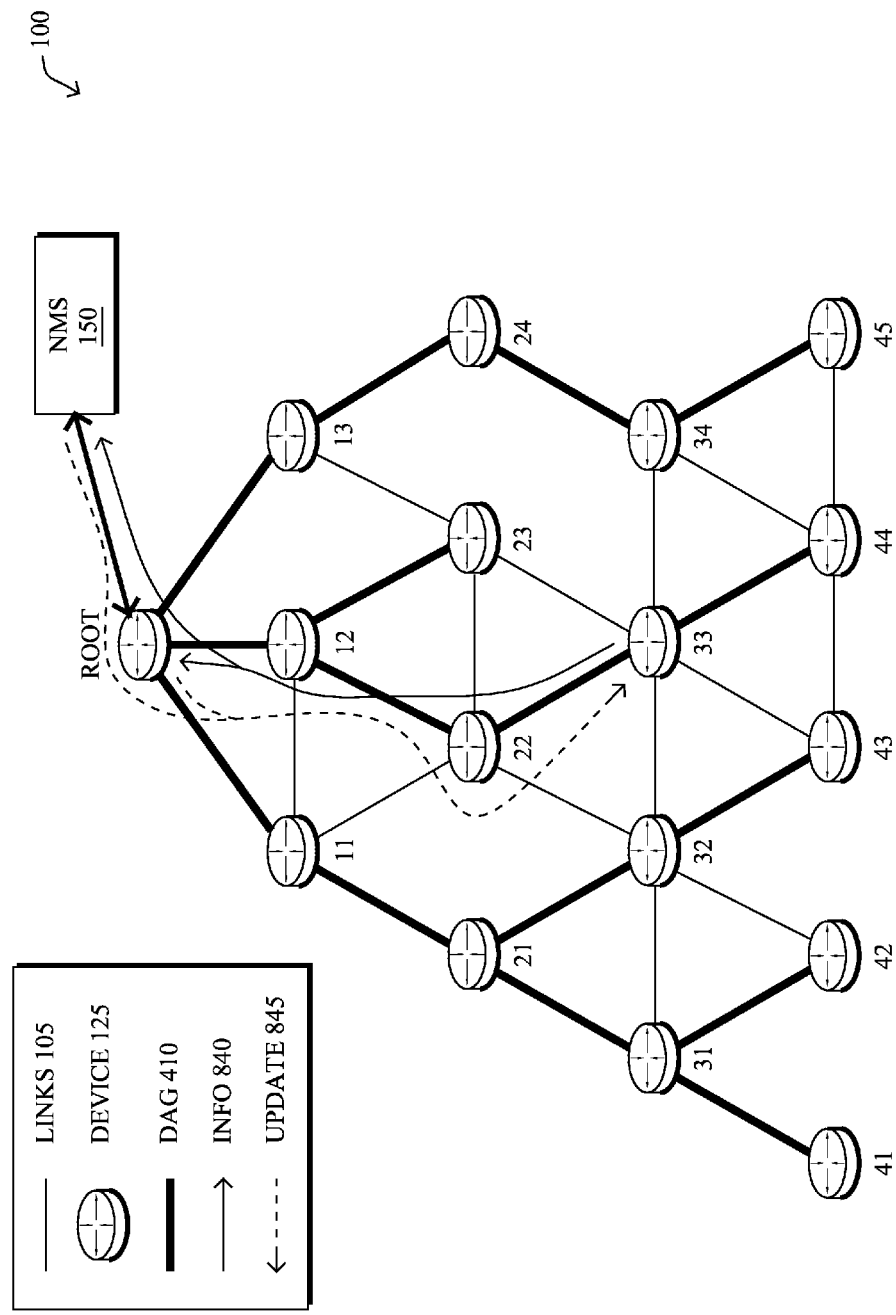
FIG. 8 illustrates an example information exchange.

Additionally, historical link data for the selected link, such as the unstable flagging or other metrics, such as the actual link quality, the number of times keepalive is monitoring is activated, etc., may be transmitted to inform a head-end application (e.g., responsible for the computer network), such as to the DAG root, the NMS 150, or other management device. For instance, as illustrated in FIG. 8, the head-end application may be informed using messages 840 according to a protocol such as the Constrained Application Protocol (CoAP), or other suitable protocol that allows the network devices to notify the head-end application of various metrics or other information. (Note that as shown in FIG. 8, information 840 is only sent from the particular device, node 33. However, in practice, this information may be transmitted from more or all of the nodes of the network, accordingly.)

According to the historical data provided by the nodes, the values of Qmin, Qmax, and Qpct may then be dynamically changed by the head-end, e.g., according to the service level agreement (SLA) required for the traffic transiting through those links. In this manner, the network devices may thus receive one or more updated threshold values 845 from the head-end application, e.g., either out-of-band or as TLVs. (Note that as shown in FIG. 8, updates 845 are only sent to the particular device, node 33. However, in practice, this update may be transmitted to more or all of the nodes of the network, accordingly.)

In another embodiment herein, the head-end/NMS can monitor how many times an application is retransmitting from a source to a destination, in general, e.g., from the root node to node 44, or else to any number of nodes to determine a general network-wide link quality state. Based on the retransmission count, the Fq/Qmin/Qmax/Qpct values can be tuned and pushed down to the nodes in an attempt to achieve (or at least become closer to) a retransmission count of zero or otherwise a more optimally repaired topology. At the same time, however, it may be desired to reduce the amount of link repairs in the network, and as such, the threshold values may be more conservatively controlled.

Figure 9A:
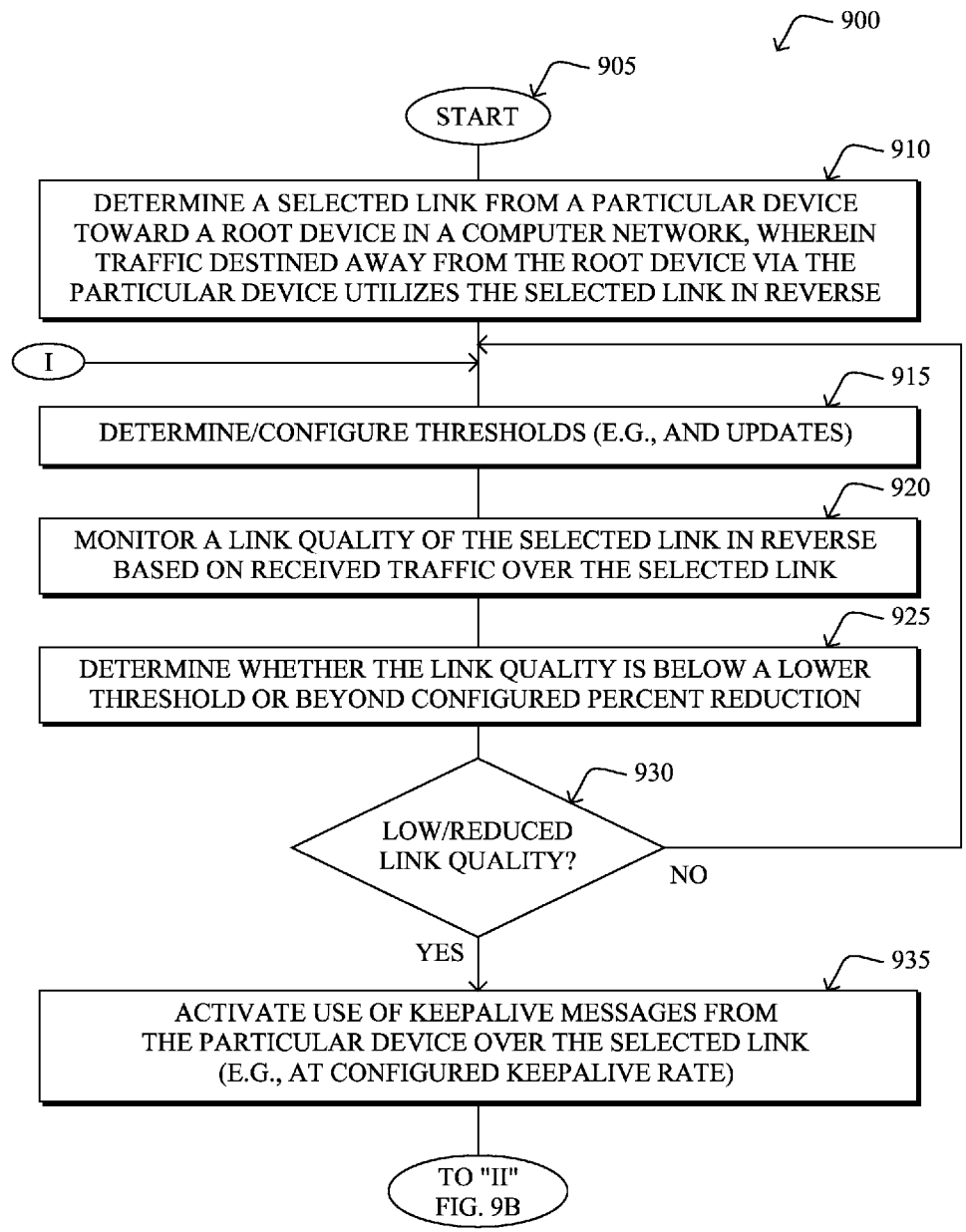
FIGS. 9A-C illustrate an example simplified procedure for dynamic activation of keepalive messages for reverse path validation.
Figure 9B:
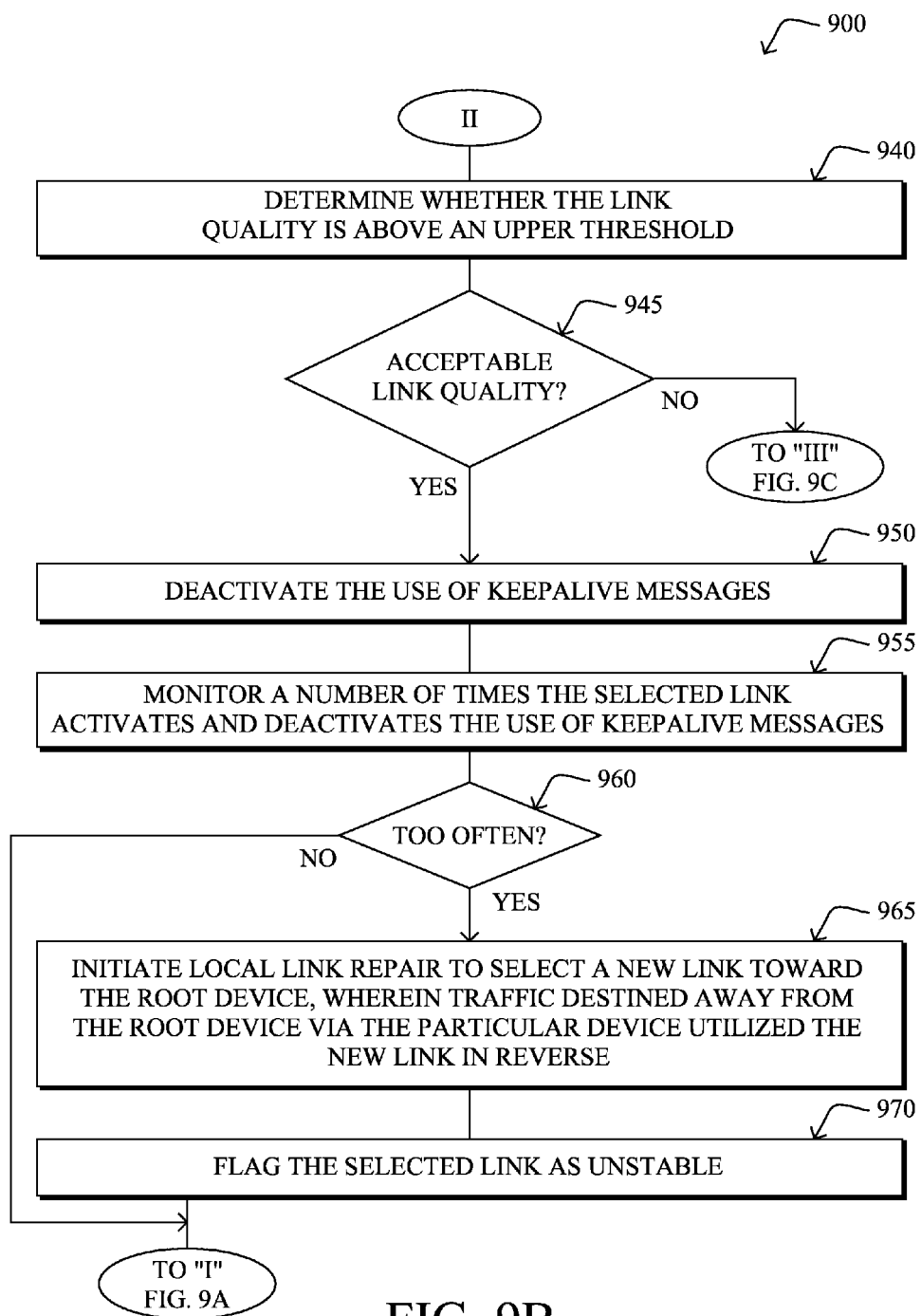
Figure 9C:
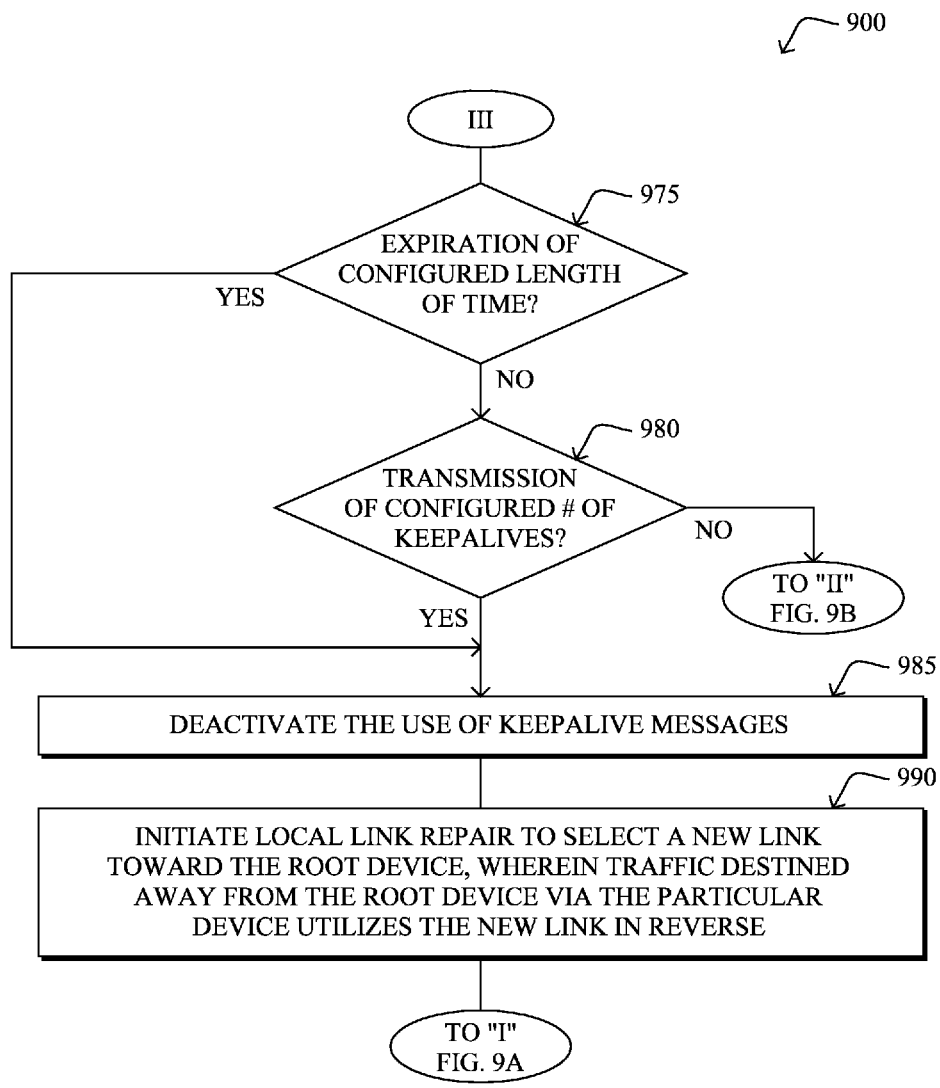

FIGS. 9A-C illustrate an example simplified procedure for dynamic activation of keepalive messages for reverse path validation in accordance with one or more embodiments described herein. The procedure 900 starts at step 905, and continues to is step 910, where, as described in greater detail above, a particular device (e.g., node 33) determines a selected link from itself toward a root device in a computer network, wherein traffic destined away from the root device via the particular device utilizes the selected link in reverse. For example, the particular device may select a parent node in the network, such that the resultant DAG link is used in the reverse by the parent node to reach the particular device.

In step 915, the particular device determines or otherwise configures the Qmin, Qmax, Qpct thresholds, as well as Fq, based on an initial configuration or else any subsequent updates as described herein. If the thresholds are configured, then in step 920 the particular device monitors link quality of the selected link in reverse based on received traffic 540 over the selected link, in order to determine in step 925 whether the link quality is below a lower threshold (Qmin) or beyond configured percent reduction (Qpct). If in step 930 it is determined that there is a low/reduced link quality, then in step 935 the particular device activates the use of keepalive messages from the particular device over the selected link (e.g., at the configured keepalive rate, Fq), accordingly, and the procedure continues to "II" of FIG. 9B. Otherwise, if the link quality is acceptable in step 930, i.e., is not low or rapidly reduced, then the procedure may return to step 915 to possibly receive an update to the threshold(s), or else simply to step 920 to continue monitoring the link quality.

Referring now to FIG. 9B, the procedure 900 continues from "II" to step 940, where the particular device may determine, based on the keepalive messages 640, whether the link quality becomes above an upper threshold. If the link quality is acceptable in step 945, such as due to a transient loss of quality, then in step 950 the use of keepalive messages is deactivated. Note that as described above, it may also be beneficial to monitor a number of times the selected link activates and deactivates the use of keepalive messages, in step 955, such that if this number is too high within a given length of time in step 960, then local link repair may be initiated in step 965 to select a new link toward the root device (where traffic destined away from the root device via the particular device utilizes the new link in reverse). Optionally, in step 970, the previously is selected link may be flagged as unstable, as mentioned above. The procedure 900, having either an acceptable selected link that has not required keepalives too often, or else having selected a new link, continues to "I" of FIG. 9A to again return to step 915 to possibly receive an update to the threshold(s), or else simply to step 920 to continue (or begin) monitoring the link quality.

Returning to step 945, while the selected link is monitored by the keepalive messages, so long as there is continued unacceptable link quality, the procedure 900 proceeds to "III" of FIG. 9C, where in step 975 the particular device checks for expiration of configured length of time for sending the keepalives, or else if not, then to step 980 to check whether a configured number of keepalives have been transmitted. If neither event has occurred, then the procedure 900 returns to "II" of FIG. 9B to continue monitoring the link quality with keepalive messages. However, if either condition in steps 975 or 980 is satisfied, then in step 985 the use of keepalive messages may be deactivated, and in step 990 local link repair may be initiated to select a new link toward the root device (again, where traffic destined away from the root device via the particular device utilizes the new link in reverse). The procedure 900 may then continue to "I" of FIG. 9A, returning to step 915 to possibly receive an update to the threshold(s), or else simply to step 920 to begin monitoring the link quality for the newly selected link.

It should be noted that while certain steps within procedure 900 may be optional as described above, the steps shown in FIGS. 9A-9C are merely examples for illustration, and certain other steps may be included or excluded as desired. For example, at any point, the particular device may inform a head-end application of historical link data for the selected link, as mentioned above. Further, while a particular order of the steps is shown, this ordering is merely illustrative, and any suitable arrangement of the steps may be utilized without departing from the scope of the embodiments herein. Moreover, while procedure 900 is shown across FIGS. 9A-9C, which are described separately, certain steps from each figure may be incorporated into each other figure, and the figures as illustrated are not meant to be mutually exclusive.

The techniques described herein, therefore, provide for dynamic activation of keepalive messages for reverse path validation in a computer network. In particular, the is techniques herein provide a distributed mechanism whereby only low-quality links are probed, alleviating the burden of probing non-degraded links. Thus, keepalives may be locally activated in corresponding areas of the network (which may change frequently) at different times, to the point where if the local network is stable (on a per-link basis), no (or limited) keepalives need to be used. Accordingly, the techniques herein address a significant issue in networks that use reverse path routing, significantly improving the path reliability and SLA, particularly in constrained networks. Also, by dynamically adjusting the rate of keepalive messages, network devices minimize overhead caused by the keepalive messages.

While there have been shown and described illustrative embodiments that provide for dynamic activation of keepalive messages for reverse path validation in a computer network, it is to be understood that various other adaptations and modifications may be made within the spirit and scope of the embodiments herein. For example, the embodiments have been shown and described herein with relation to LLNs. However, the embodiments in their broader sense are not as limited, and though well-suited for constrained networks, may, in fact, be used with other types of networks and/or protocols. In addition, while certain protocols are shown, such as RPL, other suitable protocols may be used, accordingly. Also, while the techniques generally describe the root node as the source device, other devices, particularly head-end nodes and/or network management system/server (NMS) devices, may also source data messages (e.g., in the DOWNWARD direction).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a selected link from a particular device toward a root device in a computer network, wherein traffic destined away from the root device via the particular device utilizes the selected link in reverse;
   monitoring a link quality of the selected link in reverse based on received traffic over the selected link;
   determining whether the link quality is below a lower threshold;
   in response to the link quality being below the lower threshold, activating use of keepalive messages from the particular device over the selected link; and
   deactivating the use of keepalive messages in response to determining that the link quality is above an upper threshold.

2. The method as in claim 1, further comprising:
   monitoring a number of times the selected link activates and deactivates the use of keepalive messages; and
   in response to the number of times being greater than a configured amount within a configured length of time, initiating local link repair to select a new link toward the root device, wherein traffic destined away from the root device via the particular device utilizes the new link in reverse.

3. The method as in claim 2, further comprising:
   flagging the selected link as unstable in response to the number of times being greater than the configured amount within a configured length of time.

4. The method as in claim 1, further comprising:
   deactivating the use of keepalive messages in response to one of either expiration of a configured length of time after activating the use or transmission of a configured number of keepalive messages, having determined that the link quality is not above an upper threshold.

5. The method as in claim 4, further comprising:
   in response to deactivating the use of keepalive messages in response to one of either expiration of the configured length of time after activating the use or transmission of the configured number of keepalive messages, initiating local link repair to select a new link toward the root device, wherein traffic destined away from the root device via the particular device utilizes the new link in reverse.

6. The method as in claim 1, further comprising:
   determining whether the link quality is reduced beyond a configured percent threshold within a configured length of time; and
   in response to the link quality being reduced beyond the configured percent threshold within the configured length of time, activating use of keepalive messages from the particular device over the selected link.

7. The method as in claim 1, further comprising:
   informing a head-end application responsible for the computer network of historical link data for the selected link.

8. The method as in claim 1, further comprising:
   receiving, from a head-end application responsible for the computer network, an updated lower threshold.

9. The method as in claim 1, wherein the lower threshold is shared with all nodes within the computer network.

10. The method as in claim 1, further comprising:
configuring the lower threshold based on a configuration mechanism selected from a group consisting of: out-of-band signaling; a configuration service; and an objective function of a routing topology for the computer network.

11. The method as in claim 1, further comprising:
configuring a rate at which keepalive messages are transmitted during activated use.

12. An apparatus, comprising:
one or more network interfaces to communicate in a computer network;
a processor coupled to the network interfaces and adapted to execute one or more processes; and
a memory configured to store a process executable by the processor, the process when executed operable to:
determine a selected link from the apparatus toward a root device in the computer network, wherein traffic destined away from the root device via the apparatus utilizes the selected link in reverse;
monitor a link quality of the selected link in reverse based on received traffic over the selected link;
determine whether the link quality is below a lower threshold;
activate use of keepalive messages from the apparatus over the selected link in response to the link quality being below the lower threshold; and
deactivate the use of keepalive messages in response to determining that the link quality is above an upper threshold.

13. The apparatus as in claim 12, wherein the process when executed is further operable to:
monitor a number of times the selected link activates and deactivates the use of keepalive messages; and
initiate local link repair to select a new link toward the root device in response to the number of times being greater than a configured amount within a configured length of time, wherein traffic destined away from the root device via the apparatus utilizes the new link in reverse.

14. The apparatus as in claim 12, wherein the process when executed is further operable to:
deactivate the use of keepalive messages in response to one of either expiration of a configured length of time after activating the use or transmission of a configured number of keepalive messages, having determined that the link quality is not above an upper threshold.

15. The apparatus as in claim 14, wherein the process when executed is further operable to:
initiate local link repair to select a new link toward the root device in response to deactivating the use of keepalive messages in response to one of either expiration of the configured length of time after activating the use or transmission of the configured number of keepalive messages, wherein traffic destined away from the root device via the apparatus utilizes the new link in reverse.

16. The apparatus as in claim 12, wherein the process when executed is further operable to:
determine whether the link quality is reduced beyond a configured percent threshold within a configured length of time; and
activate use of keepalive messages from the apparatus over the selected link in response to the link quality being reduced beyond the configured percent threshold within the configured length of time.

17. The apparatus as in claim 12, wherein the process when executed is further operable to:
inform a head-end application responsible for the computer network of historical link data for the selected link.

18. The apparatus as in claim 12, wherein the process when executed is further operable to:
receive, from a head-end application responsible for the computer network, an updated lower threshold.

19. A tangible, non-transitory, computer-readable media having software encoded thereon, the software, when executed by a processor on a particular device, operable to:
determine a selected link from the particular device toward a root device in a computer network, wherein traffic destined away from the root device via the particular device utilizes the selected link in reverse;
monitor a link quality of the selected link in reverse based on received traffic over the selected link;
determine whether the link quality is below a lower threshold; and
activate use of keepalive messages from the particular device over the selected link in response to the link quality being below the lower threshold;
deactivate the use of keepalive messages in response to determining that the link quality is above an upper threshold.

20. The computer-readable media as in claim 19, wherein the software when executed is further operable to:
deactivate the use of keepalive messages in response to one of either expiration of a configured length of time after activating the use or transmission of a configured number of keepalive messages, having determined that the link quality is not above an upper threshold.

21. The computer-readable media as in claim 20, wherein the software when executed is further operable to:
initiate local link repair to select a new link toward the root device in response to deactivating the use of keepalive messages in response to one of either expiration of the configured length of time after activating the use or transmission of the configured number of keepalive messages, wherein traffic destined away from the root device via the particular device utilizes the new link in reverse.

22. The computer-readable media as in claim 19, wherein the software when executed is further operable to:
determine whether the link quality is reduced beyond a configured percent threshold within a configured length of time; and
activate use of keepalive messages from the particular device over the selected link in response to the link quality being reduced beyond the configured percent threshold within the configured length of time.

* * * * *